(12) United States Patent
Alizadeh Attar et al.

(10) Patent No.: US 9,716,665 B2
(45) Date of Patent: Jul. 25, 2017

(54) METHOD FOR SHARDING ADDRESS LOOKUPS

(71) Applicant: Cisco Technology, Inc., San Jose, CA (US)

(72) Inventors: Mohammadreza Alizadeh Attar, Santa Clara, CA (US); Navindra Yadav, Cupertino, CA (US); Satyam Sinha, Sunnyvale, CA (US); Thomas J. Edsall, Los Gatos, CA (US); Kit Chiu Chu, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 89 days.

(21) Appl. No.: 14/472,148

(22) Filed: Aug. 28, 2014

(65) Prior Publication Data
US 2015/0124820 A1    May 7, 2015

Related U.S. Application Data

(60) Provisional application No. 61/900,369, filed on Nov. 5, 2013.

(51) Int. Cl.
| | |
|---|---|
| *H04L 12/863* | (2013.01) |
| *H04L 12/937* | (2013.01) |
| *H04L 29/08* | (2006.01) |
| *H04L 29/12* | (2006.01) |
| *H04L 29/06* | (2006.01) |
| *H04L 12/413* | (2006.01) |

(Continued)

(52) U.S. Cl.
CPC .............. *H04L 47/50* (2013.01); *H04L 45/74* (2013.01); *H04L 45/7453* (2013.01); *H04L 47/125* (2013.01); *H04L 47/56* (2013.01); *H04L 49/25* (2013.01); *H04L 49/254* (2013.01); *H04L 61/6004* (2013.01); *H04L 61/6095* (2013.01); *H04L 67/22* (2013.01); *H04L 67/322* (2013.01); *H04L 69/167* (2013.01); *H04L 69/22* (2013.01); *H04L 61/103* (2013.01); *H04L 61/2084* (2013.01)

(58) Field of Classification Search
CPC ..... H04L 49/254; H04L 67/322; H04L 67/22; H04L 47/56; H04L 61/2084; H04L 61/103; H04L 45/74; H04L 45/7453; H04L 47/125; H04L 61/6004; H04L 61/6095; H04L 69/167; H04L 47/50; H04L 49/25; H04L 69/22
See application file for complete search history.

(56) References Cited

U.S. PATENT DOCUMENTS

| | | | |
|---|---|---|---|
| 6,098,109 A | 8/2000 | Kotzur et al. | |
| 6,434,662 B1 * | 8/2002 | Greene | ............. G06F 17/30949 707/E17.035 |

(Continued)

*Primary Examiner* — Redentor Pasia
*Assistant Examiner* — Peter Mak
(74) *Attorney, Agent, or Firm* — Polsinelli PC

(57) ABSTRACT

Various embodiments of the present disclosure provide methods for randomly mapping entries in a suitable lookup table across multiple switch devices and/or multiple switch chipsets in each of the multiple switch devices by using two or more independent hash functions. In some embodiments, the number of entries in the lookup table is equal to be the least common multiple of all possible M (i.e., a number of switch devices) choosing R values (i.e., a desired redundancy level).

17 Claims, 7 Drawing Sheets

(51) Int. Cl.
*H04L 12/741* (2013.01)
*H04L 12/947* (2013.01)
*H04L 12/803* (2013.01)
*H04L 12/743* (2013.01)
*H04L 12/875* (2013.01)

(56) References Cited

U.S. PATENT DOCUMENTS

| | | |
|---|---|---|
| 7,103,035 B1 | 9/2006 | Kanuri |
| 7,426,185 B1 | 9/2008 | Musacchio et al. |
| 7,580,409 B1 | 8/2009 | Swenson et al. |
| 7,724,760 B2 | 5/2010 | Balakrishnan et al. |
| 8,259,571 B1 | 9/2012 | Raphel et al. |
| 8,391,289 B1 | 3/2013 | Yalagandula et al. |
| 2003/0174710 A1* | 9/2003 | Gooch .............. H04L 45/04 370/395.32 |
| 2004/0090913 A1 | 5/2004 | Scudder et al. |
| 2005/0147095 A1 | 7/2005 | Guerrero et al. |
| 2006/0050632 A1 | 3/2006 | Griggs |
| 2007/0115982 A1 | 5/2007 | Pope et al. |
| 2010/0287171 A1 | 11/2010 | Schneider |
| 2011/0026403 A1* | 2/2011 | Shao .............. H04L 67/2895 370/235 |
| 2012/0163164 A1 | 6/2012 | Terry et al. |
| 2012/0207175 A1 | 8/2012 | Raman et al. |
| 2014/0114995 A1 | 4/2014 | Kelley |
| 2014/0122743 A1 | 5/2014 | Di Benedetto et al. |
| 2014/0173129 A1 | 6/2014 | Basso et al. |
| 2015/0124614 A1 | 5/2015 | Attar et al. |
| 2015/0124805 A1 | 5/2015 | Yadav et al. |

* cited by examiner

METHOD FOR SHARDING ADDRESS LOOKUPS

CROSS REFERENCE TO RELATED APPLICATION

This application is a continuation of U.S. Patent Application No. 61/900,369, filed Nov. 5, 2013, which is expressly incorporated herein by reference in its entirety.

TECHNICAL FIELD

The present disclosure relates generally to address lookups in a telecommunications network.

BACKGROUND

Address lookup is a common operation performed by many Internet switches and routers. Looking up an address in a table is usually combined with a hashing operation and the performance of the lookup process depends on both the hash function and organization of table entries. Doing a lookup operation means searching for an address in the table. The challenges in the field of address lookup continue to increase with demands for more, faster and better techniques having greater flexibility and adaptability. Therefore, a need has arisen for a new system and method for efficient and low-cost address lookup techniques.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
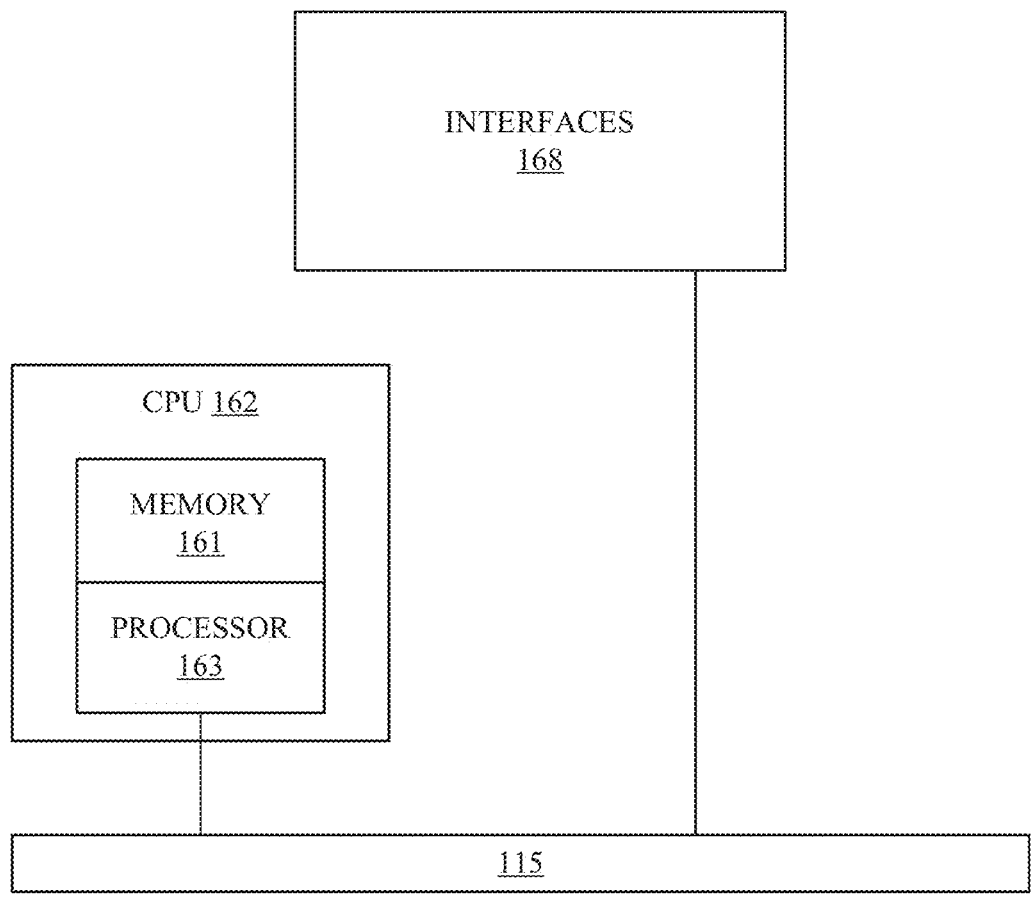
FIG. 1 illustrates an example network device in accordance with various embodiments.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Systems and methods in accordance with various embodiments of the present disclosure provide a solution to the above-mentioned problems by sharding or spreading forwarding entries across multiple switch devices such that the distribution of two or more switch devices chosen for a particular address is substantially random, and changes in the number of switch devices and/or redundancy factor impose minimal disruption in receiving and sending a particular packet. More specifically, various embodiments of the present disclosure provide methods for randomly mapping entries in a suitable lookup table across multiple switch devices and/or multiple switch chipsets in each of the multiple switch devices by using two or more independent hash functions.

In some embodiments, processes of randomly mapping entries across multiple switch chipsets can include two or more separate steps (e.g., selecting switch devices for each address and/or selecting a specific switch chipset on a corresponding switch device). Unrelated hash functions may be used in different steps of the processes of randomly mapping entries across multiple switch chipsets. Some embodiments may only store fabric shard patterns to reduce storage complexity.

In some embodiments, the number of entries in the lookup table is equal to the least common multiple of all possible M (i.e., a number of switch devices) choosing R values (i.e., a desired redundancy level). Changes in the number of switch devices and/or redundancy factor may impose minimal disruption in packet distributions.

DESCRIPTION

A computer network is a geographically distributed collection of nodes interconnected by communication links and segments for transporting data between endpoints, such as personal computers and workstations. Many types of networks are available, with the types ranging from local area networks (LANs) and wide area networks (WANs) to overlay and software-defined networks, such as virtual extensible local area networks (VXLANs).

LANs typically connect nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by an intermediate network node, such as a router, to extend the effective "size" of each network.

Overlay networks generally allow virtual networks to be created and layered over a physical network infrastructure. Overlay network protocols, such as Virtual Extensible LAN (VXLAN), Network Virtualization using Generic Routing Encapsulation (NVGRE), Network Virtualization Overlays (NVO3), and Stateless Transport Tunneling (STT), provide a traffic encapsulation scheme which allows network traffic to be carried across L2 and L3 networks over a logical tunnel Such logical tunnels can be originated and terminated through virtual tunnel end points (VTEPs).

Moreover, overlay networks can include virtual segments, such as VXLAN segments in a VXLAN overlay network, which can include virtual L2 and/or L3 overlay networks over which VMs communicate. The virtual segments can be identified through a virtual network identifier (VNI), such as a VXLAN network identifier, which can specifically identify an associated virtual segment or domain.

Network virtualization allows hardware and software resources to be combined in a virtual network. For example, network virtualization can allow multiple numbers of VMs to be attached to the physical network via respective virtual LANs (VLANs). The VMs can be grouped according to their respective VLAN, and can communicate with other VMs as well as other devices on the internal or external network.

Network segments, such as physical or virtual segments, networks, devices, ports, physical or logical links, and/or traffic in general can be grouped into a bridge or flood domain. A bridge domain or flood domain can represent a broadcast domain, such as an L2 broadcast domain. A bridge domain or flood domain can include a single subnet, but can also include multiple subnets. Moreover, a bridge domain can be associated with a bridge domain interface on a network device, such as a switch. A bridge domain interface can be a logical interface which supports traffic between an L2 bridged network and an L3 routed network. In addition, a bridge domain interface can support internet protocol (IP) termination, VPN termination, address resolution handling, MAC addressing, etc. Both bridge domains and bridge domain interfaces can be identified by a same index or identifier.

Furthermore, endpoint groups (EPGs) can be used in a network for mapping applications to the network. In particular, EPGs can use a grouping of application endpoints in a network to apply connectivity and policy to the group of applications. EPGs can act as a container for buckets or collections of applications, or application components, and tiers for implementing forwarding and policy logic. EPGs also allow separation of network policy, security, and forwarding from addressing by instead using logical application boundaries.

Cloud computing can also be provided in one or more networks to provide computing services using shared resources. Cloud computing can generally include Internet-based computing in which computing resources are dynamically provisioned and allocated to client or user computers or other devices on-demand, from a collection of resources available via the network (e.g., "the cloud"). Cloud computing resources, for example, can include any type of resource, such as computing, storage, and network devices, virtual machines (VMs), etc. For instance, resources may include service devices (firewalls, deep packet inspectors, traffic monitors, load balancers, etc.), compute/processing devices (servers, CPU's, memory, brute force processing capability), storage devices (e.g., network attached storages, storage area network devices), etc. In addition, such resources may be used to support virtual networks, virtual machines (VM), databases, applications (Apps), etc.

Cloud computing resources may include a "private cloud," a "public cloud," and/or a "hybrid cloud." A "hybrid cloud" can be a cloud infrastructure composed of two or more clouds that inter-operate or federate through technology. In essence, a hybrid cloud is an interaction between private and public clouds where a private cloud joins a public cloud and utilizes public cloud resources in a secure and scalable manner. Cloud computing resources can also be provisioned via virtual networks in an overlay network, such as a VXLAN.

In a modular switch, the number of forwarding entries can be scaled by spreading or "sharding" addresses across multiple switch devices. Each of the multiple switch devices holds part of a lookup table. However, it remains a challenge to determine a switch device that a particular address resides on at the time of programming the lookup table and/or when doing lookups at line rate. Quite often, the addresses in the lookup table are not evenly spread across the multiple switch devices. As a result, many active addresses are mapped to a small set of switch devices, which lead to hotspot issues. Therefore, an improved "sharding" or spreading algorithm is desired to evenly and randomly shard or spread addresses across multiple switch devices. The disclosed technology addresses the need in the art for sharding address lookups in a telecommunications network. Disclosed are systems, methods, and computer-readable storage media for randomly and evenly mapping entries in a lookup/forwarding table across multiple switch devices. A brief introductory description of example systems and networks, as illustrated in FIGS. 1 through 4, is disclosed herein. A detailed description of an example process for generating a forwarding table and randomly and evenly mapping entries in the forwarding table across multiple switch devices, related concepts, and example variations, will then follow. These variations shall be described herein as the various embodiments are set forth. The disclosure now turns to FIG. 1.

FIG. 1 illustrates an example network device 110 suitable for implementing the present invention. Network device 110 includes a master central processing unit (CPU) 162, interfaces 168, and a bus 115 (e.g., a PCI bus). When acting under the control of appropriate software or firmware, the CPU 162 is responsible for executing packet management, error detection, and/or routing functions, such as miscabling detection functions, for example. The CPU 162 preferably accomplishes all these functions under the control of software including an operating system and any appropriate applications software. CPU 162 may include one or more processors 163 such as a processor from the Motorola family of microprocessors or the MIPS family of microprocessors. In an alternative embodiment, processor 163 is specially designed hardware for controlling the operations of router 110. In a specific embodiment, a memory 161 (such as non-volatile RAM and/or ROM) also forms part of CPU 162. However, there are many different ways in which memory could be coupled to the system.

The interfaces 168 are typically provided as interface cards (sometimes referred to as "line cards"). Generally, they control the sending and receiving of data packets over the network and sometimes support other peripherals used with the router 110. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 162 to efficiently perform routing computations, network diagnostics, security functions, etc.

Although the system shown in FIG. 1 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 161) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Figure 2B:
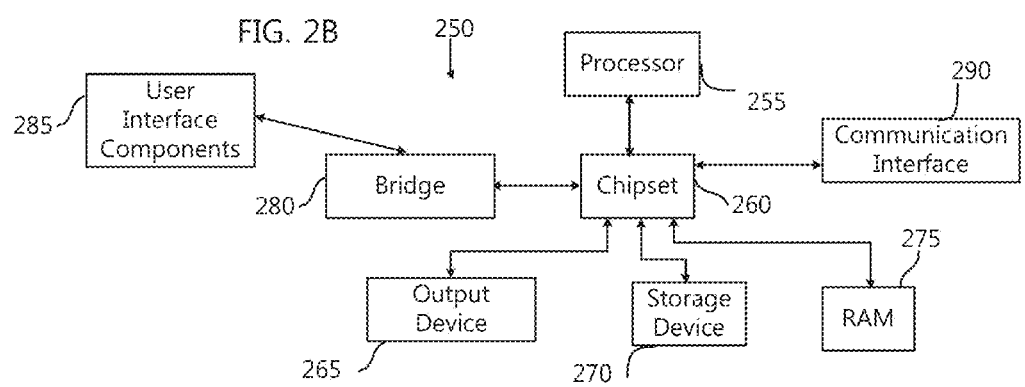
FIGS. 2A and 2B illustrate example system embodiments in accordance with various implementations of the technology.
Figure 2A:
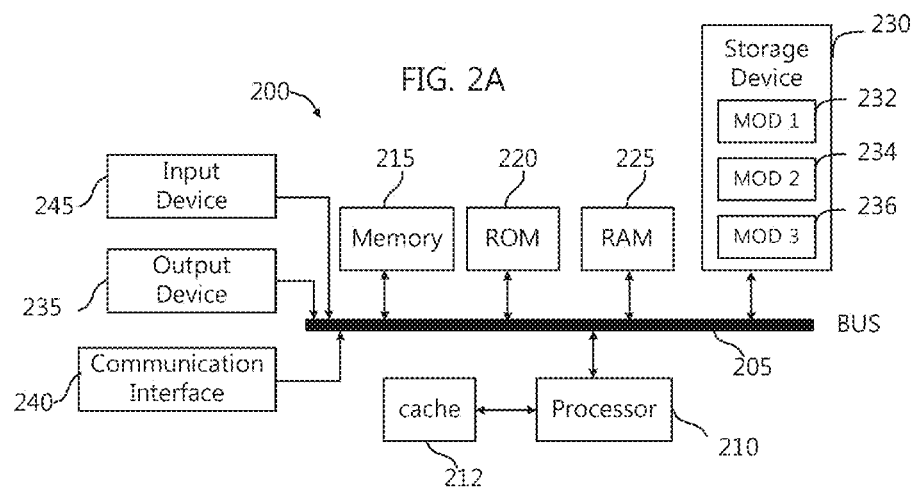

FIG. 2A, and FIG. 2B illustrate example possible system embodiments. The more appropriate embodiment will be apparent to those of ordinary skill in the art when practicing the present technology. Persons of ordinary skill in the art will also readily appreciate that other system embodiments are possible.

FIG. 2A illustrates a conventional system bus computing system architecture 200 wherein the components of the system are in electrical communication with each other using a bus 205. Example system 200 includes a processing unit (CPU or processor) 210 and a system bus 205 that couples various system components including the system memory 215, such as read only memory (ROM) 220 and random access memory (RAM) 225, to the processor 210. The system 200 can include a cache of high-speed memory connected directly with, in close proximity to, or integrated as part of the processor 210. The system 200 can copy data from the memory 215 and/or the storage device 230 to the cache 212 for quick access by the processor 210. In this way, the cache can provide a performance boost that avoids processor 210 delays while waiting for data. These and other modules can control or be configured to control the processor 210 to perform various actions. Other system memory 215 may be available for use as well. The memory 215 can include multiple different types of memory with different performance characteristics. The processor 210 can include any general purpose processor and a hardware module or software module, such as module 1 232, module 2 234, and module 3 236 stored in storage device 230, configured to control the processor 210 as well as a special-purpose processor where software instructions are incorporated into the actual processor design. The processor 210 may essentially be a completely self-contained computing system, containing multiple cores or processors, a bus, memory controller, cache, etc. A multi-core processor may be symmetric or asymmetric.

To enable user interaction with the computing device 200, an input device 245 can represent any number of input mechanisms, such as a microphone for speech, a touch-sensitive screen for gesture or graphical input, keyboard, mouse, motion input, speech and so forth. An output device 235 can also be one or more of a number of output mechanisms known to those of skill in the art. In some instances, multimodal systems can enable a user to provide multiple types of input to communicate with the computing device 200. The communications interface 240 can generally govern and manage the user input and system output. There is no restriction on operating on any particular hardware arrangement and therefore the basic features here may easily be substituted for improved hardware or firmware arrangements as they are developed.

Storage device 230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 225, read only memory (ROM) 220, and hybrids thereof.

The storage device 230 can include software modules 232, 234, 236 for controlling the processor 210. Other hardware or software modules are contemplated. The storage device 230 can be connected to the system bus 205. In one aspect, a hardware module that performs a particular function can include the software component stored in a computer-readable medium in connection with the necessary hardware components, such as the processor 210, bus 205, output device 235 (e.g., a display), and so forth, to carry out the function.

FIG. 2B illustrates a computer system 250 having a chipset architecture that can be used in executing the described method and generating and displaying a graphical user interface (GUI). Computer system 250 is an example of computer hardware, software, and firmware that can be used to implement the disclosed technology. System 250 can include a processor 255, representative of any number of physically and/or logically distinct resources capable of executing software, firmware, and hardware configured to perform identified computations. Processor 255 can communicate with a chipset 260 that can control input to and output from processor 255. In this example, chipset 260 outputs information to output 265, such as a display, and can read and write information to storage device 270, which can include magnetic media, and solid state media, for example. Chipset 260 can also read data from and write data to RAM 275. A bridge 280 for interfacing with a variety of user interface components 285 can be provided for interfacing with chipset 260. Such user interface components 285 can include a keyboard, a microphone, touch detection and processing circuitry, a pointing device, such as a mouse, and so on. In general, inputs to system 250 can come from any of a variety of sources, machine generated and/or human generated.

Chipset 260 can also interface with one or more communication interfaces 290 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 255 analyzing data stored in storage 270 or RAM 275. Further, the machine can receive inputs from a user via user interface components 285 and execute appropriate functions, such as browsing functions by interpreting these inputs using processor 255.

It can be appreciated that example systems 200 and 250 can have more than one processor 210 or be part of a group or cluster of computing devices networked together to provide greater processing capability.

Figure 3:
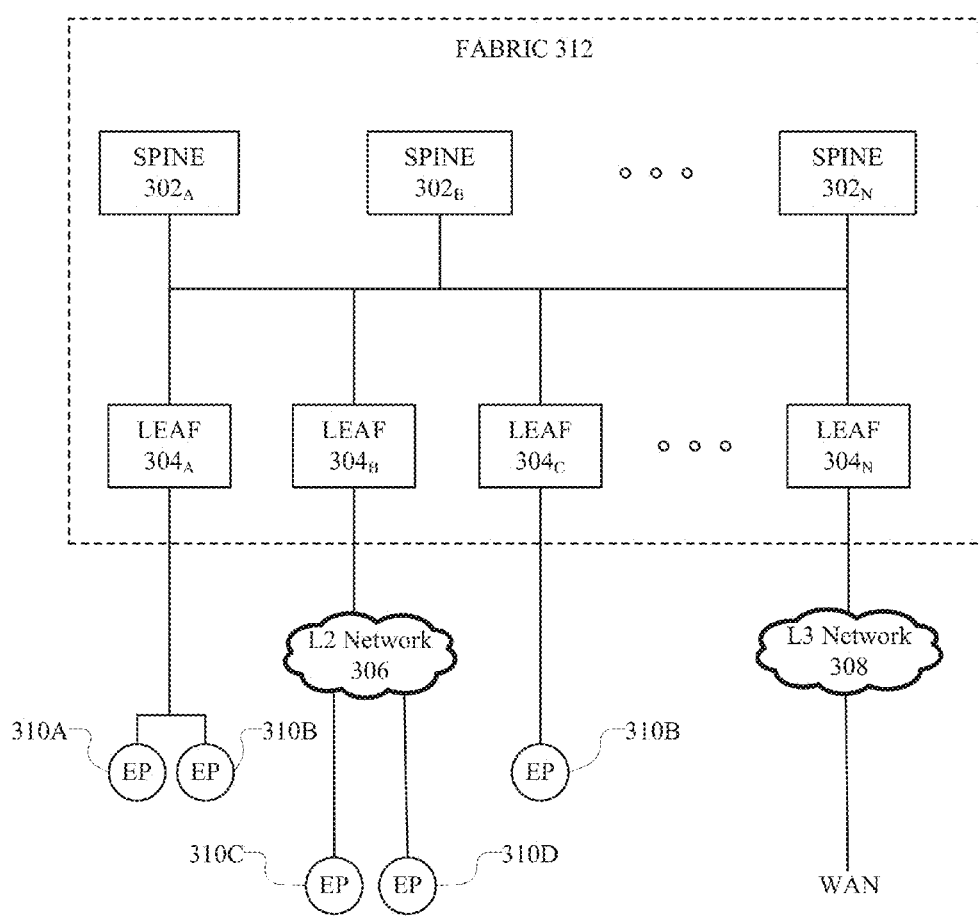
FIG. 3 illustrates a schematic block diagram of an example architecture for a network fabric in accordance with various embodiments.

FIG. 3 illustrates a schematic block diagram of an example architecture 300 for a network fabric 312. The network fabric 312 can include spine switches $302_A$, $302_B$, ..., $302_N$ (collectively "302") connected to leaf switches $304_A$, $304_B$, $304_C$, ..., $304_N$ (collectively "304") in the network fabric 312.

Spine switches 302 can be L3 switches in the fabric 312. However, in some cases, the spine switches 302 can also, or otherwise, perform L2 functionalities. Further, the spine switches 302 can support various capabilities, such as 40 or 10 Gbps Ethernet speeds. To this end, the spine switches 302 can include one or more 40 Gigabit Ethernet ports. Each port can also be split to support other speeds. For example, a 40 Gigabit Ethernet port can be split into four 10 Gigabit Ethernet ports.

In some embodiments, one or more of the spine switches 302 can be configured to host a proxy function that performs a lookup of the endpoint address identifier to locator mapping in a mapping database on behalf of leaf switches 304 that do not have such mapping. The proxy function can do this by parsing through the packet to the encapsulated, tenant packet to get to the destination locator address of the tenant. The spine switches 302 can then perform a lookup of their local mapping database to determine the correct locator address of the packet and forward the packet to the locator address without changing certain fields in the header of the packet.

When a packet is received at a spine switch $302_i$, the spine switch $302_i$ can first check if the destination locator address is a proxy address. If so, the spine switch $302_i$ can perform the proxy function as previously mentioned. If not, the spine switch $302_i$ can lookup the locator in its forwarding table and forward the packet accordingly.

Spine switches 302 connect to leaf switches 304 in the fabric 312. Leaf switches 304 can include access ports (or non-fabric ports) and fabric ports. Fabric ports can provide uplinks to the spine switches 302, while access ports can provide connectivity for devices, hosts, endpoints, VMs, or external networks to the fabric 312.

Leaf switches 304 can reside at the edge of the fabric 312, and can thus represent the physical network edge. In some cases, the leaf switches 304 can be top-of-rack ("ToR") switches configured according to a ToR architecture. In other cases, the leaf switches 304 can be aggregation switches in any particular topology, such as end-of-row (EoR) or middle-of-row (MoR) topologies. The leaf switches 304 can also represent aggregation switches, for example.

The leaf switches 304 can be responsible for routing and/or bridging the tenant packets and applying network policies. In some cases, a leaf switch can perform one or more additional functions, such as implementing a mapping cache, sending packets to the proxy function when there is a miss in the cache, encapsulate packets, enforce ingress or egress policies, etc.

Moreover, the leaf switches 304 can contain virtual switching functionalities, such as a virtual tunnel endpoint (VTEP) function as explained below in the discussion of VTEP 408 in FIG. 4. To this end, leaf switches 304 can connect the fabric 312 to an overlay network, such as overlay network 400 illustrated in FIG. 4.

Network connectivity in the fabric 312 can flow through the leaf switches 304. Here, the leaf switches 304 can provide servers, resources, endpoints, external networks, or VMs access to the fabric 312, and can connect the leaf switches 304 to each other. In some cases, the leaf switches 304 can connect EPGs to the fabric 312 and/or any external networks. Each EPG can connect to the fabric 312 via one of the leaf switches 304, for example.

Endpoints 310A-E (collectively "310") can connect to the fabric 312 via leaf switches 304. For example, endpoints 310A and 310B can connect directly to leaf switch 304A, which can connect endpoints 310A and 310B to the fabric 312 and/or any other one of the leaf switches 304. Similarly, endpoint 310E can connect directly to leaf switch 304C, which can connect endpoint 310E to the fabric 312 and/or any other of the leaf switches 304. On the other hand, endpoints 310C and 310D can connect to leaf switch 304B via L2 network 306. Similarly, the wide area network (WAN) can connect to the leaf switches 304C or 304D via L3 network 308.

Endpoints 310 can include any communication device, such as a computer, a server, a switch, a router, etc. In some cases, the endpoints 310 can include a server, hypervisor, or switch configured with a VTEP functionality which connects an overlay network, such as overlay network 400 below, with the fabric 312. For example, in some cases, the endpoints 310 can represent one or more of the VTEPs 408A-D illustrated in FIG. 4. Here, the VTEPs 408A-D can connect to the fabric 312 via the leaf switches 304. The overlay network can host physical devices, such as servers, applications, EPGs, virtual segments, virtual workloads, etc. In addition, the endpoints 310 can host virtual workload(s), clusters, and applications or services, which can connect with the fabric 312 or any other device or network, including an external network. For example, one or more endpoints 310 can host, or connect to, a cluster of load balancers or an EPG of various applications.

Although the fabric 312 is illustrated and described herein as an example leaf-spine architecture, one of ordinary skill in the art will readily recognize that the subject technology can be implemented based on any network fabric, including any data center or cloud network fabric. Indeed, other architectures, designs, infrastructures, and variations are contemplated herein.

Figure 4:
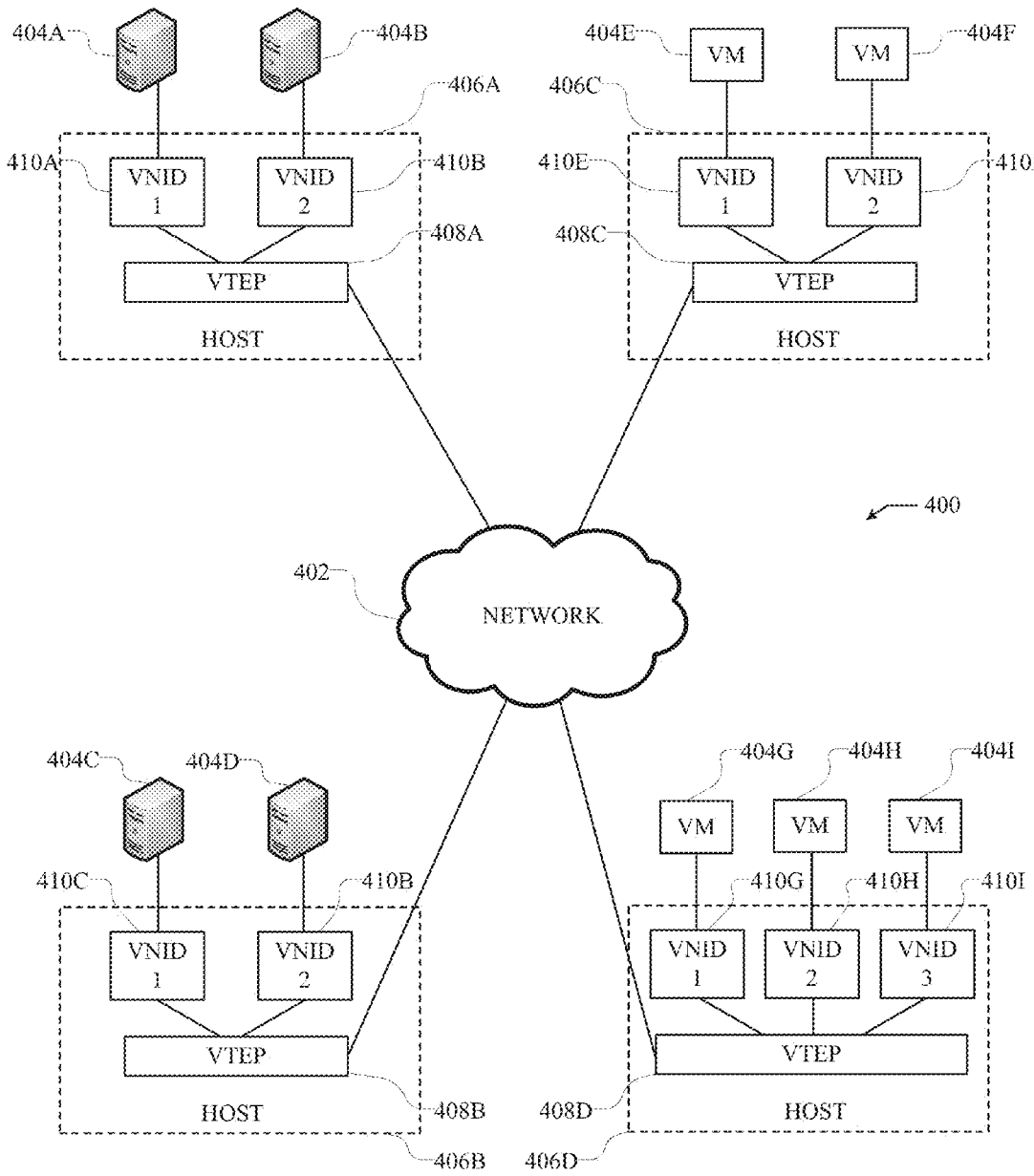
FIG. 4 illustrates an example overlay network in accordance with various embodiments.

FIG. 4 illustrates an example overlay network 400. Overlay network 400 uses an overlay protocol, such as VXLAN, VGRE, VO3, or STT, to encapsulate traffic in L2 and/or L3 packets which can cross overlay L3 boundaries in the network. As illustrated in FIG. 4, overlay network 400 can include hosts 406A-D interconnected via network 402.

Network 402 can include a packet network, such as an IP network, for example. Moreover, network 402 can connect the overlay network 400 with the fabric 312 in FIG. 3. For example, VTEPs 408A-D can connect with the leaf switches 304 in the fabric 312 via network 402.

Hosts 406A-D include virtual tunnel end points (VTEP) 408A-D, which can be virtual nodes or switches configured to encapsulate and de-encapsulate data traffic according to a specific overlay protocol of the network 400, for the various virtual network identifiers (VNIDs) 410A-I. Moreover, hosts 406A-D can include servers containing a VTEP functionality, hypervisors, and physical switches, such as L3 switches, configured with a VTEP functionality. For example, hosts 406A and 406B can be physical switches configured to run VTEPs 408A-B. Here, hosts 406A and 406B can be connected to servers 404A-D, which, in some cases, can include virtual workloads through VMs loaded on the servers, for example.

In some embodiments, network 400 can be a VXLAN network, and VTEPs 408A-D can be VXLAN tunnel end points. However, as one of ordinary skill in the art will readily recognize, network 400 can represent any type of overlay or software-defined network, such as NVGRE, STT, or even overlay technologies yet to be invented.

The VNIDs can represent the segregated virtual networks in overlay network 400. Each of the overlay tunnels (VTEPs 408A-D) can include one or more VNIDs. For example, VTEP 408A can include VNIDs 1 and 2, VTEP 408B can include VNIDs 1 and 3, VTEP 408C can include VNIDs 1 and 2, and VTEP 408D can include VNIDs 1-3. As one of ordinary skill in the art will readily recognize, any particular VTEP can, in other embodiments, have numerous VNIDs, including more than the 3 VNIDs illustrated in FIG. 4.

The traffic in overlay network 400 can be segregated logically according to specific VNIDs. This way, traffic intended for VNID 1 can be accessed by devices residing in VNID 1, while other devices residing in other VNIDs (e.g., VNIDs 2 and 3) can be prevented from accessing such traffic. In other words, devices or endpoints connected to specific VNIDs can communicate with other devices or endpoints connected to the same specific VNIDs, while traffic from separate VNIDs can be isolated to prevent devices or endpoints in other specific VNIDs from accessing traffic in different VNIDs.

Servers 404A-D and VMs 404E-I can connect to their respective VNID or virtual segment, and communicate with other servers or VMs residing in the same VNID or virtual segment. For example, server 404A can communicate with server 404C and VMs 404E and 404G because they all reside in the same VNID, viz., VNID 1. Similarly, server 404B can communicate with VMs 404F, H because they all reside in VNID 2. VMs 404E-I can host virtual workloads, which can include application workloads, resources, and services, for example. However, in some cases, servers 404A-D can similarly host virtual workloads through VMs hosted on the servers 404A-D. Moreover, each of the servers 404A-D and VMs 404E-I can represent a single server or VM, but can also represent multiple servers or VMs, such as a cluster of servers or VMs.

VTEPs 408A-D can encapsulate packets directed at the various VNIDs 1-3 in the overlay network 400 according to the specific overlay protocol implemented, such as VXLAN, so traffic can be properly transmitted to the correct VNID and recipient(s). Moreover, when a switch, router, or other network device receives a packet to be transmitted to a recipient in the overlay network 400, it can analyze a routing table, such as a lookup table, to determine where such packet needs to be transmitted so the traffic reaches the appropriate recipient. For example, if VTEP 408A receives a packet from endpoint 404B that is intended for endpoint 404H, VTEP 408A can analyze a routing table that maps the intended endpoint, endpoint 404H, to a specific switch that is configured to handle communications intended for endpoint 404H. VTEP 408A might not initially know, when it receives the packet from endpoint 404B, that such packet should be transmitted to VTEP 408D in order to reach endpoint 404H. Accordingly, by analyzing the routing table, VTEP 408A can lookup endpoint 404H, which is the intended recipient, and determine that the packet should be transmitted to VTEP 408D, as specified in the routing table based on endpoint-to-switch mappings or bindings, so the packet can be transmitted to, and received by, endpoint 404H as expected.

However, continuing with the previous example, in many instances, VTEP 408A may analyze the routing table and fail to find any bindings or mappings associated with the intended recipient, e.g., endpoint 404H. Here, the routing table may not yet have learned routing information regarding endpoint 404H. In this scenario, the VTEP 408A may likely broadcast or multicast the packet to ensure the proper switch associated with endpoint 404H can receive the packet and further route it to endpoint 404H.

In some cases, the routing table can be dynamically and continuously modified by removing unnecessary or stale entries and adding new or necessary entries, in order to maintain the routing table up-to-date, accurate, and efficient, while reducing or limiting the size of the table.

As one of ordinary skill in the art will readily recognize, the examples and technologies provided above are simply for clarity and explanation purposes, and can include many additional concepts and variations.

Figure 5:
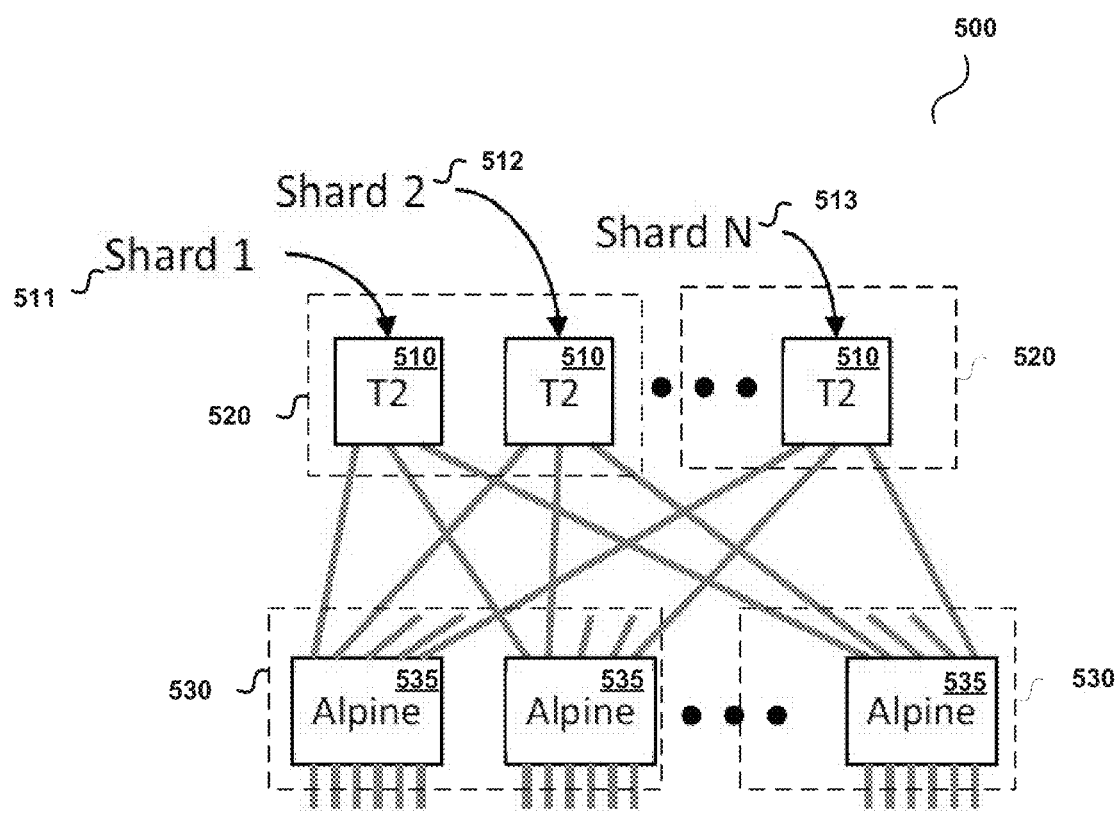
FIG. 5 illustrates a simplified architecture of a system with line cards and network switch devices in a telecommunications network, in accordance with various embodiments.

FIG. 5 illustrates a simplified architecture of a system 500 with line cards and network switch devices in a telecommunications network in accordance with various embodiments. In this example, the simplified architecture 500 includes two or more line cards 530, each of which may include two or more chipsets (e.g., Alpine 535), and two or more switch devices 520 (e.g., fabric cards). Each of the two or more switch devices 520 may include two or more chipsets, e.g., Trident (T2) 510. Although only switch devices 520 and line cards 530 are shown within the system 500 in FIG. 5, various types of electronic or computing devices that are capable of receiving and forwarding network packets may also be included. The computing device may use operating systems that include, but are not limited to, Android, Berkeley Software Distribution (BSD), iPhone OS (iOS), Linus, OS X, Unix-like Real-time Operating System (e.g., QNX), Microsoft Windows, Window Phone, and IBM z/OS.

Depending on the desired implementation in the system 500, a variety of networking and messaging protocols may be used, including but not limited to TCP/IP, open systems interconnection (OSI), file transfer protocol (FTP), universal plug and play (UpnP), network file system (NFS), common internet file system (CIFS), AppleTalk etc. As would be appreciated by those skilled in the art, the system 500 illustrated in FIG. 5 is used for purposes of explanation, a network system may be implemented with many variations, as appropriate, in the configuration of network platform in accordance with various embodiments of the present disclosure.

In some embodiments, each of the switch devices keeps a database of location. The database can be queried to look up the location of each incoming packet's destination address (e.g., an IP or MAC address), which is presented in the packet header. Outgoing port or ports can then be determined to send the corresponding incoming packet. In conventional approaches, each of the chipsets in switching devices (e.g., fabric cards) stores a full copy of the location database. An incoming packet can be sent to any of the switching devices for performing a destination lookup. However, the conventional approaches have many drawbacks. For example, the total number of entries in the database is limited by the capacity of a single chipset. In the present disclosure, a sharding algorithm is used to store each database entry on a subset of the chipsets of the switching devices. A software process can be used to add entries in the database by determining corresponding chipsets that need to store the entries and program each chipset accordingly. The number of chipsets that hold each entry (also known as the number of replicas) can be a configurable parameter of the algorithm. Many advantages can be achieved in accordance with various embodiments of the present disclosure. For example, effective size of the database is no longer limited by the capacity of a single chipset; rather it scales with the number of chipsets.

When a packet arrives, the system 500 can run the same sharding algorithm that was used by software to determine placements of addresses in the database. If the result is multiple network switch devices (i.e., corresponding to the multiple replicas of the address), one of the available choices can be picked for the packet to be sent to, and ultimately delivered to its final destination.

In some embodiments, a database in a network switch device can be used to determine where to send a packet when an ingress TOR has a miss. For example, when an ingress fabric card has a miss in a global forwarding table, it will send the packet to a proxy address of one of the switch devices for an inner address lookup. Depending upon the proxy address used, the inner address can be a media access control (MAC), IPv4, IPv6, or synthetic address. According to an outcome of the inner address lookup, the switch device will then forward the packet to a proper location.

In some embodiments, a database in a network switch device can be spread or "sharded" in forwarding tables of two or more chipsets (e.g., Trident 2 devices) that can be accessed at normal network forwarding rates. In some implementations, a fraction of the database is stored in each of chipsets in the network switch device to achieve adequate capacity for the forwarding database. In this example, a fraction of the database (e.g., Shard1 511, Shard2 512 and Shard3 513) resides on one of T2s (i.e., chipsets). A process of determining a chipset that a particular address goes to when a network switch device was programmed is called "sharding." In many implementations, the forward database can be accessed at a line rate as packets are received and used to forward the packets to corresponding switch devices with a minimum latency.

In some embodiments, depending on a desired redundancy level, each address can be stored on one or more chipsets of multiple network switch devices. For example, in a modular switch device, each address may reside in at least two chipsets for redundancy. In some embodiments, the at least two chipsets for each address belong to different network switch devices. For another example, in a fixed configuration network switch (e.g., 72-port network switch), each address resides in only one of chipsets in a network switch device.

In some embodiments, an algorithm used in a "sharding" process can be used in conjunction with synthetic IPs to implement a database of a network switch device that can hold more than 1 million addresses. In the "sharding" process, there is no restriction on the number of supported virtual routing and forwarding (VRFs).

In some other embodiments, when a packet traverses network switch devices without being sent to one of proxy addresses for the switch devices, the sharding algorithm may not be used. Instead, a simple hash of the flow can be used to determine which network switch device to send the packet to.

Figure 6:
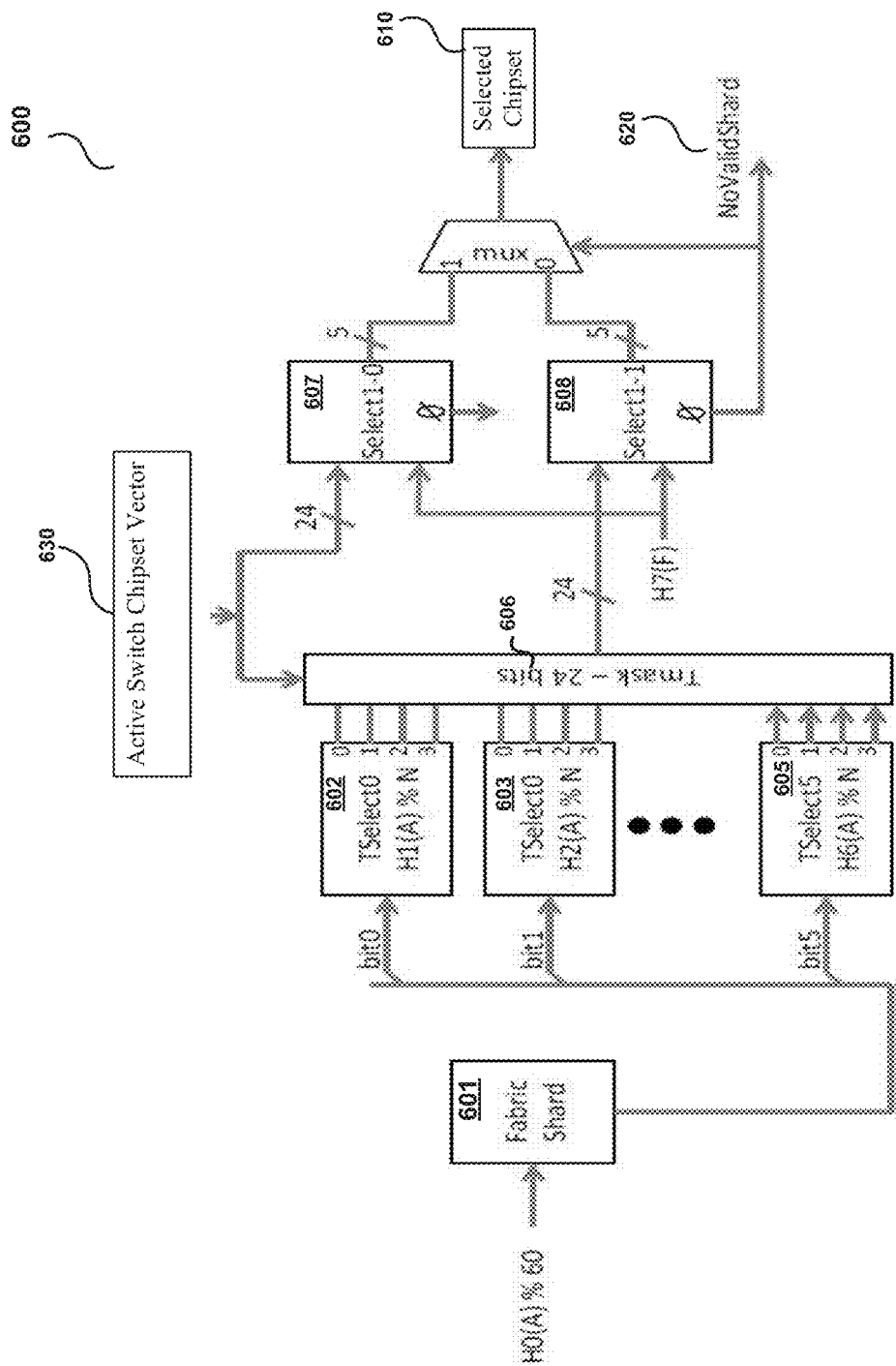
FIG. 6 illustrates an example block diagram of steps for implementing a sharding algorithm in accordance with various embodiments.

FIG. 6 illustrates an example block diagram 600 of a sharding algorithm in accordance with various embodiments. In this example, a system includes up to 6 fabric cards, each of which has up to 4 switch chipsets (e.g., Tridents). Thus, the system can have up to 24 switch chipsets. When an incoming packet arrives at a line card (LC) chipset (e.g., Alpine) in the system, the LC chipset can determine an address "A" of the incoming packet. The address "A" may be an original Internet protocol version 4 (IPv4) or Internet protocol version 6 (IPv6) address of the encapsulated packet concatenated with a representation of a VNID (e.g., an 8-bit representation of the VNID for the original IPv4 address of the incoming packet). In some embodiments, the address "A" may be a synthetic IP address generated from a hash of the concatenation of the packet VNID and the address of the encapsulated packet. The address may be either a Layer-2 MAC address or a Layer-3 IP address for IPv4 and IPv6, respectively. In many implementations, the address "A" has a 40-bit value.

In this example, a pointer into a fabric shard table is generated by hashing the address "A" of the incoming packet with a hash function H0 and taking modulo M (e.g., 60) of the result. The pointer, between 0 and 59, can be used to select a value from the fabric shard table. In some implementations, each entry in the fabric shard table is a 6-bit vector. Each "1" in the 6-bit vector may correspond to a fabric card where the address "A" can be found. Values in the fabric shard table may be selected such that each entry has R bits set to "1" when a redundancy of R is desired. In some embodiments, bits in the fabric shard table can be set such that each of bit positions is set to a "1" with substantially the same number of times across all entries in the fabric shard table. This setup may ensure that the copies of each address are evenly spread across multiple fabric cards and/or chipsets of the multiple fabric cards.

Each bit of an output vector from the fabric shard table goes to a corresponding one of the selection blocks (i.e., TSelect0 602, TSelect1 603, . . . TSelect5 605). The selection blocks can determine which switch chipset (e.g., Trident) on a given fabric card has the address of an incoming packet. In some embodiments, the selection can be done by using a unique hash per fabric card to select one of the switch chipsets (e.g., Tridents). For example, assuming there are N Tridents on a given fabric card, the unique hash can be run through a modulus N to get a specific Trident on the given fabric card. In some implementations, N has a value from 1 to 4.

In this example, outputs of the selection blocks merger into a 24-bit vector 606 with R bits set to "1". These R bits in the 24-bit vector 606 indicate which switch chipsets (e.g., Tridents) the address "A" is programmed in. These switch chipsets programmed with the address "A" can be called "valid" network switch chipsets. In some embodiments, the 24-bit vector 606 can be further masked with an Active Switch Chipset Vector 630 to create a new vector of network switch chipsets that are both "valid" and "active."

A selection block Select1-1 608 may be configured to use a hash H7 to pick one of "valid" and "active" switch chipset 610 to send the incoming packet to. In some embodiments, the hash H7 does a hash of the incoming packet flow, F, which is different from the hashes H0-H7 discussed herein. In this example, the packet flow F is used to get a maximum load balance across valid switch chipsets (e.g., Tridents) since all results out of the Select1-1 608 are possible places to send an incoming packet. In some embodiments, a flow is used to preserve an incoming packet order.

If no "valid" and "active" switch chipsets can be picked, the Select1-1 608 can assert a NoValidShard signal 620 to cause an address and the VLAN of the incoming packet to be changed to a configured IP address and a configured VLAN, respectively. An output of a selection block Select1-0 607 can then be used to determine which switch chipset (e.g., Trident) to send the incoming packet to. In some embodiments, the selection block Select1-0 607 can select one switch chipset 610 from all active switch chipsets (e.g., Tridents) to send the incoming packet. In some embodiments, if no Trident is currently active, all incoming packets are dropped.

In some embodiments, if no "valid" and "active" switch chipsets can be picked, a selected switch chipset (e.g., Trident) may forward an incoming packet to a predefined location (e.g., another network switch device) by adding a configured IP address and a configured VLAN on the packet and allow another network switch device to ultimately resolve the location of the encapsulated packet destination. In some embodiments, the configured IP address can be programmed into all of the network switch chipsets (e.g., Tridents) so that the incoming packet with the configured IP address can be sent to any one of the network switch chipsets. Some embodiments set a forwarding exception bit in the incoming packet header to prevent a forwarding loop.

Many embodiments determine the number of entries in a forwarding table. In some embodiments, the number of entries can be selected as the least common multiple of all possible M (i.e., a number of switch devices) choosing R values (i.e., a desired redundancy level). For example, assuming the number of fabric cards is 6 (i.e., M=6) and the redundancy level is 3 (i.e., R=3), there are 6 choosing 3, or 20 possible combinations. Each of 20 possible combinations should be in the forwarding table 3 times to fill all entries in the table. In this example, the number of entries in the table can be chosen as 60 because 60 is the least common multiple of all possible M choosing R values when the maximum M is 6 and R is between 1 and M inclusive. The least common multiple number of entries can make it possible for each entry for a given M and R in the table be duplicated the same number of times, which ensures an even distribution of addresses across network switch devices.

In some embodiments, whenever there is a change in the number of fabric cards, the change can be perfected by programming a fabric shard table. For example, when a fabric card is added, chipsets (e.g., Tridents) in the fabric card can be programmed before they are made active. After the chipsets in the fabric card are programmed, they are made active, but will not be used until the fabric shard table is updated. Based upon the updated fabric card information, each entry in the fabric shard table that needs to be updated can be set to a corresponding new value, which may have just as many bits set as the previous value. According to the updated entries in the fabric shard table, incoming packets can then be seamlessly forwarded to the newly available network switch device.

When all entries in the fabric shard table have been updated in response to a change in the number of fabric cards and/or a redundancy level, addresses in network switch devices that are no longer used can be removed. In some embodiments, when one fabric card is added or removed, for example from M fabric card to M+1 or M−1 fabric cards, only a subset of the fabric card table entries need to be updated. In some embodiments, when a redundancy level goes from R to R+1 or R−1 while keeping the number of fabric cards constant, only a subset of the fabric card table entries need to be updated. As can be seen from the block diagram 600, the example sharding algorithm discussed herein does not require excessive memory or logic, which provides a solution to evenly and randomly spread or shard addresses across multiple switch devices. Moreover, the proposed solution may allow changes in the number of fabric cards, M, or the redundancy level, R, with the smallest possible number of insertions or deletions of addresses in the fabric card chipsets, or movement of addresses between chipsets.

Figure 7:
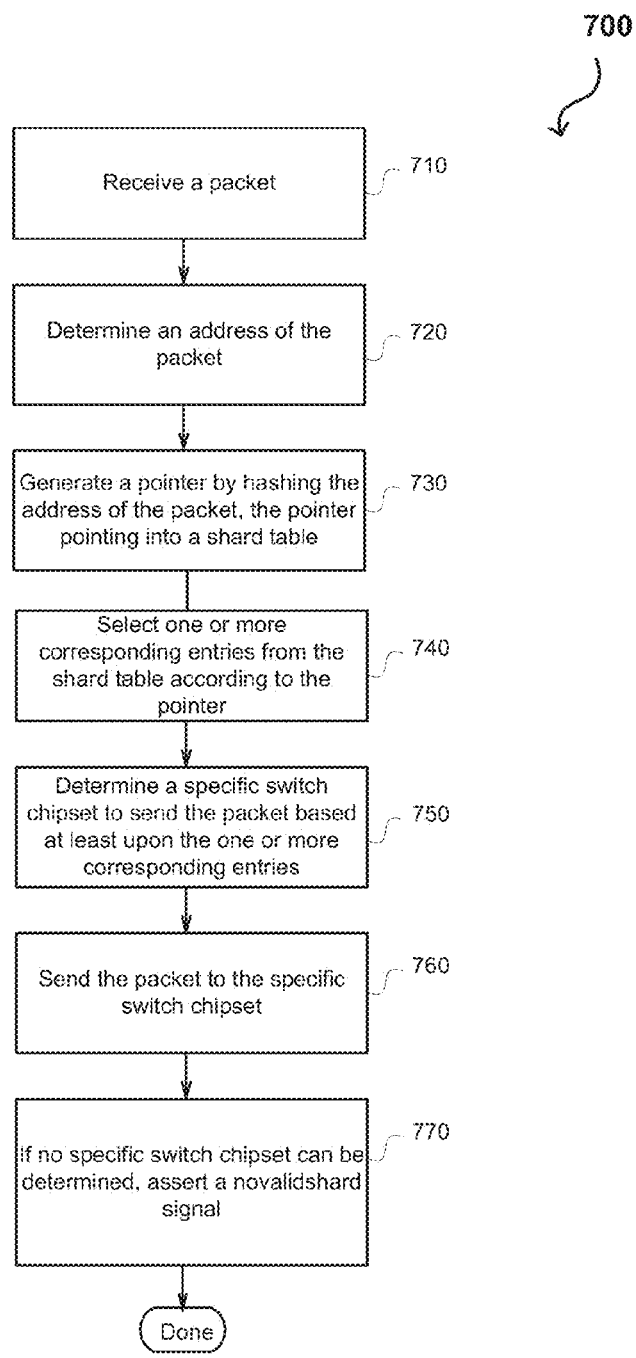
FIG. 7 illustrates an example process of forwarding incoming network packets in accordance with various embodiments.

Having disclosed some basic system components and concepts, the disclosure now turns to the example method shown in FIG. 7. For the sake of clarity, the method is described in terms of systems 110, 200, 250, 300, 400, 500 and 600, as shown in FIGS. 1-6, configured to practice the method. The steps outlined herein are example and can be implemented in any combination thereof, including combinations that exclude, add, or modify certain steps.

FIG. 7 illustrates an example process 700 of forwarding incoming network packets in accordance with various embodiments. It should be understood that there can be additional, fewer, or alternative steps performed in similar or alternative orders, or in parallel, within the scope of the various embodiments unless otherwise stated. The example method embodiment 700 starts with receiving an incoming packet, at step 710. An address of the incoming packet can be determined, at step 720. In some embodiments, the address can be an IPv4, IPv6, MAC, or synthetic address. At step 730, a pointer can be generated by hashing the address of the incoming packet, in which the pointer points into a shard table. One or more corresponding entries in the shard table can be selected by using the pointer, at step 740.

At step 750, a specific chipset (e.g., Trident) can be determined to send the incoming packet based at least upon the one or more corresponding entries in the shard table. In some embodiments, each bit of an output vector from the shard table can be combined into a vector with R bits set to "1", wherein R is a level of redundancy. The R bits in the combined vector can indicate which chipsets the address of the incoming packet is programmed in. These chipsets are "valid" chipsets. The combined vector with the R bits can be further masked with an active vector to create a new vector of network chipsets that are both "valid" and "active." In some embodiments, a hash may be used to pick one of the "valid" and "active" network chipsets to send the incoming packet to. At step 760, the incoming packet can be sent to the specific chipset.

In response to no "valid" and "active" chipset can be determined, a novalidshard signal can be asserted, at step 770. In some embodiments, the novalidshard signal may cause the incoming packet to be forwarded to a predefined network chipset that may resolve the location of the encapsulated packet destination. In some embodiments, the novalidshard signal may cause one of active chipsets to be selected to send the incoming packet to.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Various embodiments of the present disclosure provide methods for evenly and randomly spreading or sharding addresses across multiple network switch devices. While specific examples have been cited above showing how the optional operation may be employed in different instructions, other embodiments may incorporate the optional operation into different instructions. For clarity of explanation, in some instances the present disclosure may be presented as including individual functional blocks including functional blocks comprising devices, device components, steps or routines in a method embodied in software, or combinations of hardware and software.

The various embodiments can be further implemented in a wide variety of operating environments, which in some cases can include one or more server computers, user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

To the extent embodiments, or portions thereof, are implemented in hardware, the present invention may be implemented with any or a combination of the following technologies: a discrete logic circuit(s) having logic gates for implementing logic functions upon data signals, an application specific integrated circuit (ASIC) having appropriate combinational logic gates, programmable hardware such as a programmable gate array(s) (PGA), a field programmable gate array (FPGA), etc.

Most embodiments utilize at least one network that would be familiar to those skilled in the art for supporting communications using any of a variety of commercially-available protocols, such as TCP/IP, OSI, FTP, UPnP, NFS, CIFS, AppleTalk etc. The network can be, for example, a local area network, a wide-area network, a virtual private network, the Internet, an intranet, an extranet, a public switched telephone network, an infrared network, a wireless network and any combination thereof.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include server computers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from open market.

The server farm can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared computing device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and computing media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving an incoming packet;
   determining an address of the incoming packet;
   generating a pointer by hashing the address of the incoming packet, the pointer pointing into a shard table, wherein the shard table has a number of entries that is equal to a least common multiple of M and a combination of M choose R values, wherein M represents a number of multiple switch devices and R represents an integer from one to M;
   selecting one or more corresponding entries in the shard table according to the pointer;
   based at least upon the one or more corresponding entries in the shard table, determining a specific switch device from the multiple switch devices to send the incoming packet; and
   sending the incoming packet to the specific switch device.

2. The computer-implemented method of claim 1, wherein the address of the incoming packet is a media access control (MAC), Internet protocol version 4 (IPv4), Internet protocol version 6 (IPv6), or synthetic address.

3. The computer-implemented method of claim 1, wherein each of the multiple switch devices include two or more switch chipsets, a portion of the shard table residing on each of the two or more switch chipsets in the multiple switch devices.

4. The computer-implemented method of claim 3, wherein the address of the incoming packet resides on multiple chipsets of the multiple switch devices depending on a redundancy level, the multiple switch chipsets of the multiple switch devices belonging to different switch devices.

5. The computer-implemented method of claim 3, wherein the pointer is generated according to one of a plurality of hash functions, hash functions in the plurality of hash functions being distinctive from each other, further comprising:
   hashing the address of the incoming packet according to the one of the plurality of hash functions; and
   generating the pointer by taking modulo M of an outcome of the hashing the address of the incoming packet, wherein M is a number of entries in the shard table.

6. The computer-implemented method of claim 5, wherein each entry in the shard table has R bits set to a value "1", wherein R is a redundancy level representing a number of times each address is stored on one or more chipsets of the multiple switch devices.

7. The computer-implemented method of claim 5, further comprising:
   hashing the one or more corresponding entries in the shard table according to two or more hash functions selected from the plurality of hash functions, the two or more hash functions being distinctive from the one of the plurality of hash functions that was used to hash the address of the incoming packet; and
   determining one or more switch chipsets to send the incoming packet by taking modulo N of an outcome of the hashing the one or more corresponding entries in the shard table, wherein N is a number of switch chipsets in each of the multiple switch devices.

8. The computer-implemented method of claim 7, further comprising:
   determining a specific switch chipset to send the incoming packet by using one or more hash functions from the plurality of hash functions, the one or more hash functions being distinctive from the one of the plurality of hash functions used to hash the address of the incoming packet and the two or more hash functions used to hash the one or more corresponding entries in the shard table.

9. The computer-implemented method of claim 8, further comprising:
   in response to the specific switch chipset being indeterminable, asserting a nonvalidshard signal to cause an address of the incoming packet to be changed to a configured IP address; and
   forwarding the incoming packet to a particular switch device according to the configured IP address to determine an ultimate destination for the incoming packet.

10. The computer-implemented method of claim 1, further comprising:
    in response to a change in M or R, updating a subset of the entries in the shard table based at least upon the change; and
    removing addresses that are no longer needed in one or more switch chipsets of the multiple switch devices.

11. A system, comprising:
  at least one processor; and
  memory including instructions that, when executed by the at least one processor, cause the system to:
    receive an incoming packet;
    determine an address of the incoming packet;
    generate a pointer by hashing the address of the incoming packet, the pointer pointing into a shard table, wherein the shard table has a number of entries that is equal to a least common multiple of M and a combination of M choose R values, wherein M represents a number of multiple switch devices and R represents an integer from one to M;
    select one or more corresponding entries in the shard table according to the pointer;
    based at least upon the one or more corresponding entries in the shard table, determine a specific switch device from the multiple switch devices to send the incoming packet; and
    send the incoming back to the specific switch device.

12. The system of claim 11, wherein each of the multiple switch devices include two or more switch chipsets, a portion of the shard table residing on each of the two or more switch chipsets in the multiple switch devices.

13. The system of claim 12, wherein the pointer is generated according to one of a plurality of hash functions, hash functions in the plurality of hash functions being distinctive from each other, and wherein the instructions when executed further cause the system to:
  hash the address of the incoming packet according to the one of the plurality of hash functions; and
  generate the pointer by taking modulo M of an outcome of the hashing the address of the incoming packet, wherein M is a number of entries in the shard table.

14. The system of claim 13, wherein the instructions when executed further cause the system to:
  hash the one or more corresponding entries in the shard table according to two or more hash functions selected from the plurality of hash functions, the two or more hash functions being distinctive from the one of the plurality of hash functions that was used to hash the address of the incoming packet; and
  determine one or more switch chipsets to send the incoming packet by taking modulo N of an outcome of the hashing the one or more corresponding entries in the shard table, wherein N is a number of switch chipsets in each of the multiple switch devices.

15. The system of claim 14, wherein the instructions when executed further cause the system to:
  determine a specific switch chipset to send the incoming packet by using one or more hash functions from the plurality of hash functions, the one or more hash functions being distinctive from the one of the plurality of hash functions used to hash the address of the incoming packet and the two or more hash functions used to hash the one or more corresponding entries in the shard table.

16. The system of claim 11, wherein the instructions when executed further cause the system to:
  in response to a change in M or R, update a subset of the entries in the shard table based at least upon the change, wherein each of the multiple switch devices include two or more switch chipsets, a portion of the shard table residing on each of the two or more switch chipsets in the multiple switch devices; and
  remove addresses that are no longer needed in the switch chipsets of the multiple switch devices.

17. A non-transitory computer-readable storage medium including instructions that, when executed by at least one processor of a computing system, cause the computing system to:
  receive an incoming packet;
  determine an address of the incoming packet;
  generate a pointer by hashing the address of the incoming packet, the pointer pointing into a shard table, wherein the shard table has a number of entries that is equal to a least common multiple of M and a combination of M choose R values, wherein M represents a number of multiple switch devices and R represents an integer from one to M;
  select one or more corresponding entries in the shard table according to the pointer;
  based at least upon the one or more corresponding entries in the shard table, determine a specific switch device from the multiple switch devices to send the incoming packet; and
  send the incoming back to the specific switch device.

* * * * *